United States Patent
Kim (10) Patent No.: US 7,877,119 B2
(45) Date of Patent: Jan. 25, 2011

(54) MOBILE COMMUNICATIONS DEVICE WITH ROTATABLE SCREEN AND QWERTY KEYPAD

(75) Inventor: Young S. Kim, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 763 days.

(21) Appl. No.: 11/835,917

(22) Filed: Aug. 8, 2007

(65) Prior Publication Data

US 2008/0039155 A1   Feb. 14, 2008

Related U.S. Application Data

(60) Provisional application No. 60/836,644, filed on Aug. 8, 2006.

(30) Foreign Application Priority Data

Jul. 23, 2007   (KR) ...................... 10-2007-0073343

(51) Int. Cl.
 *H04M 1/00* (2006.01)
 *H04B 1/38* (2006.01)
(52) U.S. Cl. ................ 455/575.1; 455/556.1; 455/90.2; 455/575.4; 455/575.3
(58) Field of Classification Search ............. 455/575.1, 455/556.1, 575.4, 575.3, 90.2; 16/367; 710/15
See application file for complete search history.

(56) References Cited

U.S. PATENT DOCUMENTS

| | | | | |
|---|---|---|---|---|
| 7,168,135 B2 * | 1/2007 | Jung et al. | .................... | 16/367 |
| 7,269,442 B2 * | 9/2007 | Sato et al. | ................ | 455/556.1 |
| 7,610,069 B2 * | 10/2009 | Kwak et al. | .............. | 455/575.4 |
| 2005/0107137 A1 * | 5/2005 | Byun et al. | .............. | 455/575.1 |
| 2005/0125570 A1 * | 6/2005 | Olodort et al. | ................ | 710/15 |
| 2006/0046797 A1 | 3/2006 | Chen | | |
| 2006/0063569 A1 * | 3/2006 | Jacobs et al. | ............. | 455/575.1 |
| 2007/0135181 A1 * | 6/2007 | Ohki et al. | .............. | 455/575.1 |

FOREIGN PATENT DOCUMENTS

| | | |
|---|---|---|
| KR | 1020050038982 | 4/2005 |
| KR | 1020060049059 | 5/2006 |
| KR | 1020070037262 | 4/2007 |

* cited by examiner

*Primary Examiner*—Charles N Appiah
*Assistant Examiner*—Kiet Doan
(74) *Attorney, Agent, or Firm*—The Farrell Law Firm, LLP (57) ABSTRACT

Disclosed is a mobile communication device. The mobile communication device includes a first body section having a keypad arranged on a first upper surface thereof; and a second body section connected to the first body section and having a display screen arranged on an upper surface thereof, the second body section linearly sliding from a first position where the second body section overlays the first body section to a second position where the second body section exposes a first part of the keypad, the first part providing input functions of numerals and letters, the second body section rotating while facing the first upper surface from the first position to a third position where the second body section fully exposes the keypad. The communications device can selectively provide QWERTY keyboard arrangement, thereby allowing increasingly integrated electronics and complex features sufficiently utilized and long text messages easily edited.

22 Claims, 8 Drawing Sheets

MOBILE COMMUNICATIONS DEVICE WITH ROTATABLE SCREEN AND QWERTY KEYPAD

PRIORITY

This application claims priority to a Provisional Patent Application filed in US Patent & Trademark Office on Aug. 8, 2006 and assigned Ser. No. 60/836,644, and to a Patent Application filed in the Korean Intellectual Property Office on Jul. 23, 2007 and assigned Serial No. 10-2007-0073343, the contents of which are hereby incorporated by reference.

BACKGROUND OF THE INVENTION

1. Field of the Invention

The present invention relates to a mobile communications device, and more particularly to a mobile communications device with text messaging capability using a QWERTY keypad.

2. Description of the Related Art

In today's mobile society, an increasingly large number of individuals carry mobile communications devices such as cellular phones. The mobile communications devices not only provide voice communications but also a variety of other functions, such as E-mail, Internet access, photography and game playing. For example, the Motorola RAZR® phone has the ability to playback digital videos, offers wireless connectivity for Internet access, and has an integrated digital camera. The Nokia® N91 phone has an integrated digital music player along with mobile Internet and other smart phone features.

In these and other current cell phones, the telephone keypad provides functions of dialing phone numbers, texting messages, and executing menus embedded in the terminal itself. However, the electronics within mobile or cellular phones become more enhanced devices and the features that can be provided on these phones become more complex, whereas the telephone keypad becomes a limiting factor as it may not be able to accommodate and support all features.

There is, therefore, a need for a mobile communications device that can be easily used for performing functions of a mobile phone and cellular phone but also for performing the added functions, such as that of text messaging, besides the normal communication functions.

SUMMARY OF THE INVENTION

Accordingly, the present invention has been made to solve the above-mentioned problems occurring in the prior art, and the present invention provides a mobile communications device including a keypad which can accommodate and support enhanced electronics and complex features.

Also, the present invention provides a mobile communications device that not only provides mobile communication functions such as those of current mobile phones and cellular phones, but can also easily to use added functions such as text messaging, besides the normal communication functions.

In accordance with an aspect of the present invention, there is provided a mobile communications device including a first body section having a keypad arranged on an upper surface thereof; and a second body section connected to the first body section, the second body section having a display screen arranged on an upper surface thereof, wherein the second body section is operable to linearly slide from a first position at which the second body section overlays the first body section to a second position at which the second body section exposes a part of the keypad, and operable to rotate while facing the first body section from the first position to a third position at which the second body section fully exposes the keypad, and wherein the part of the keypad exposed when the second body section is located at the second position provides input functions of numerals and letters.

In accordance with another aspect of the present invention, there is provided a first body section having a keypad arranged in an upper surface thereof, the first body section providing a rotation axis extending perpendicular to the upper surface thereof; and a second body section connected to the first body section, the second body section having a display screen arranged in an upper surface thereof and having speaker devices disposed respectively above and below the display screen, wherein the second body section is operable to linearly slide from a first position at which the second body section overlays the first body section to a second position at which the second body section exposes a part of the keypad, and operable to rotate about the rotation axis from the first position to a third position at which the second body section fully exposes the keypad.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

A mobile communications device according to the present invention includes a first body section provided with an alphanumeric keypad portion and a QWERTY keypad disposed in an upper surface thereof and a second body section provided with a display screen disposed in an upper surface thereof, in which the second body section overlays the first body section in a first position (home position).

The second body section is slidable relative to the first body section from the first position overlaying the first body section to a second position exposing the alphanumeric keypad, thereby permitting the mobile communications device to be used as a mobile phone.

The second body section is rotatable relative to the first body section from the first position overlaying the first body section to a third position exposing the QWERTY keypad, thereby facilitating other features added to the mobile communications device, such as text messaging using the mobile communications device, etc.

Hereinafter, exemplary embodiments of the present invention will be described with reference to the accompanying drawings. In the following description of the present invention, a detailed description of known functions and configurations incorporated herein will be omitted for clarity and conciseness.

As shown in FIGS. 1 to 6, a mobile communications device 100 according to an exemplary embodiment of the present invention includes a first body section 101 and a second body section 102, in which the second body section 102 can linearly slide from a first position at which the second body section 102 overlays the first body section 101 to a second position at which the second body section 102 exposes a part of an upper surface of the first body section 101. The second body section 102 can also rotate from the first position to a third position at which the second body section 102 is located at one side of and in parallel to the first body section 101. The first body section 101 provides a rotation axis A (shown in FIG. 5) extending substantially perpendicular to the upper surface thereof. The rotation axis A is positioned at a midpoint portion on one side of the first body section 101. Therefore, the second body section 102 rotates about the rotation axis A to be located at the third position, in which the second body section 102 is parallel to and latitudinally aligned with the first body section 101.

Figure 1:
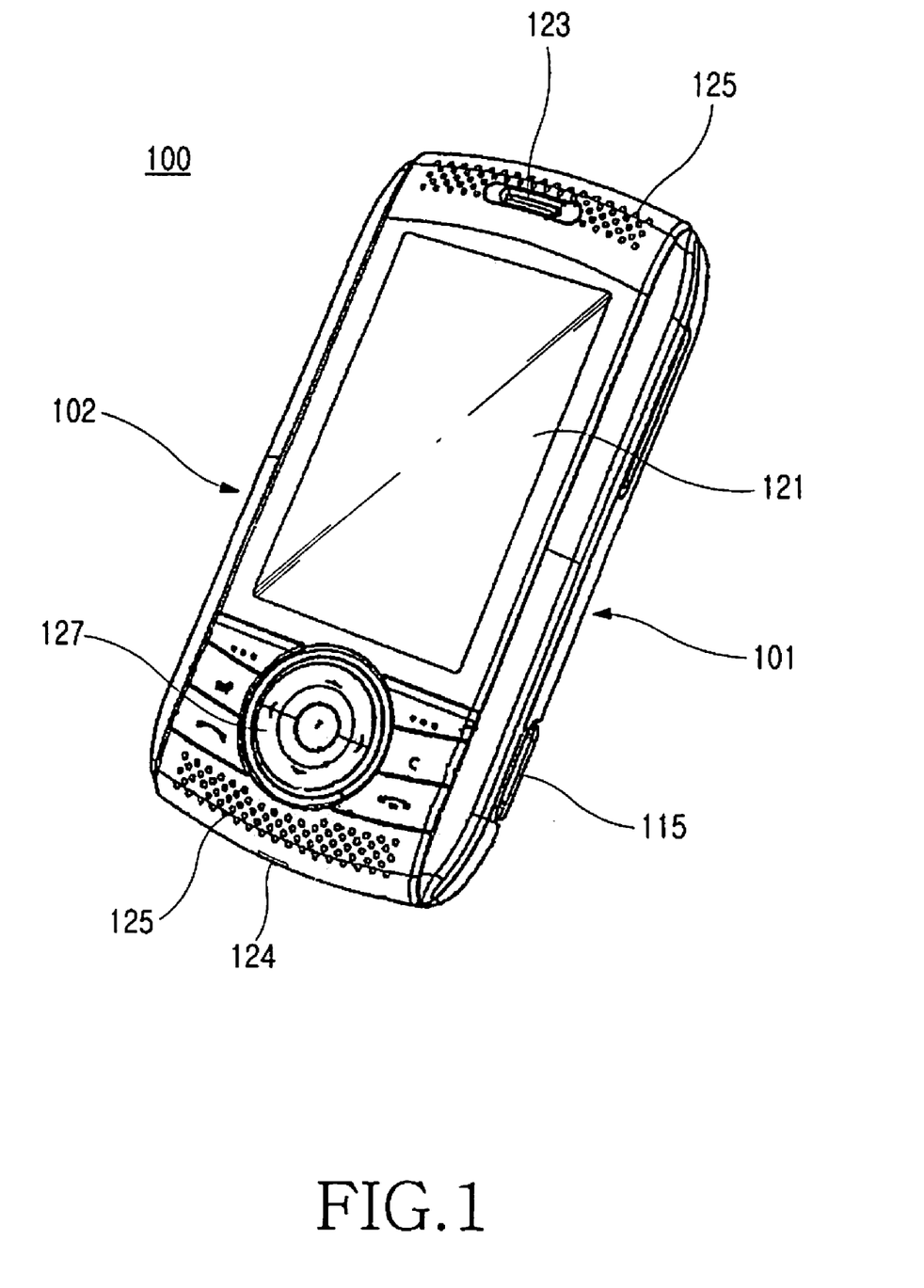
FIG. 1 is a perspective view of a mobile communications device according to the present invention.
Figure 3:
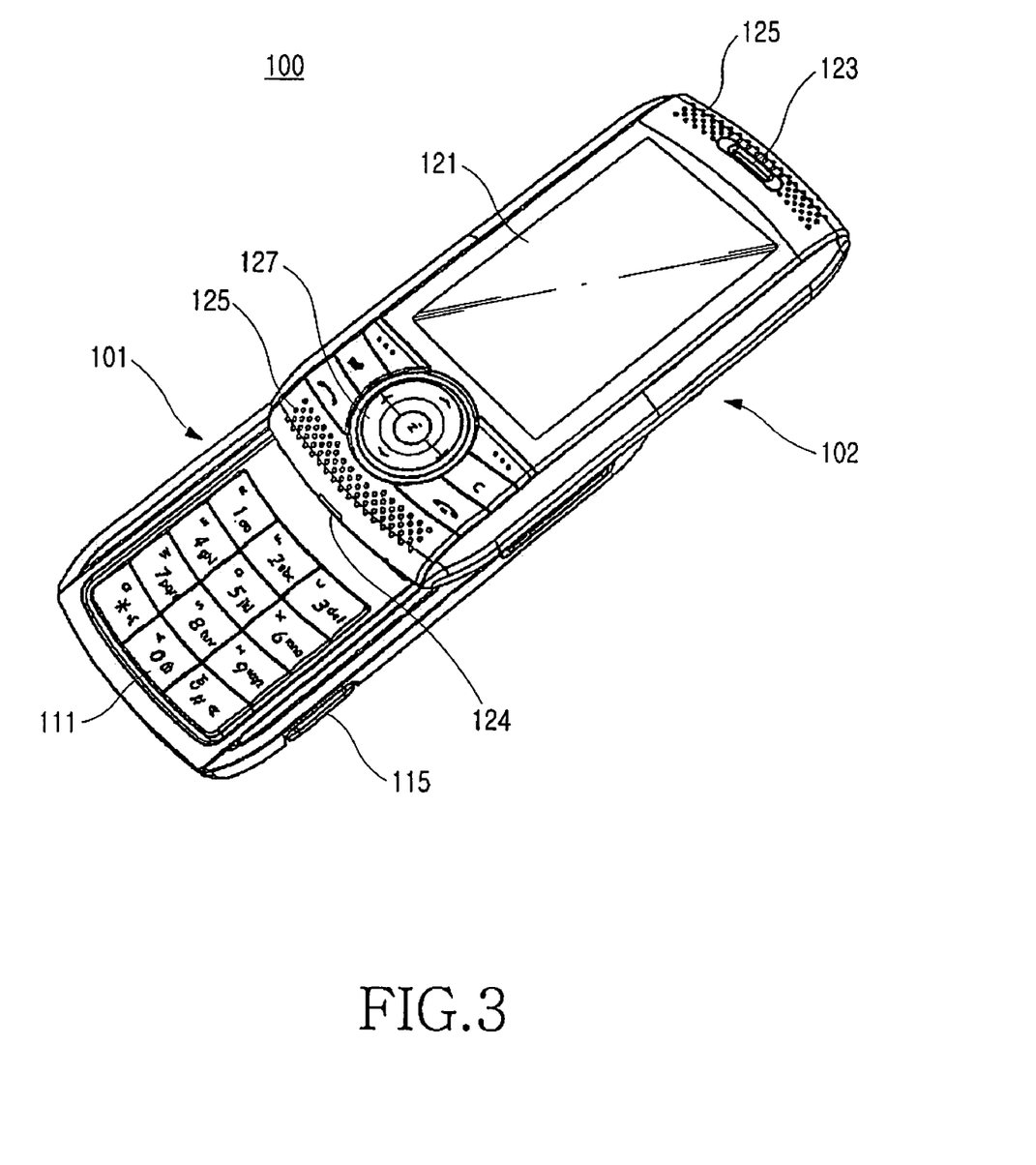
FIG. 3 is a perspective view of the mobile communications device of FIG. 1, in which a second body has slid.
Figure 5:
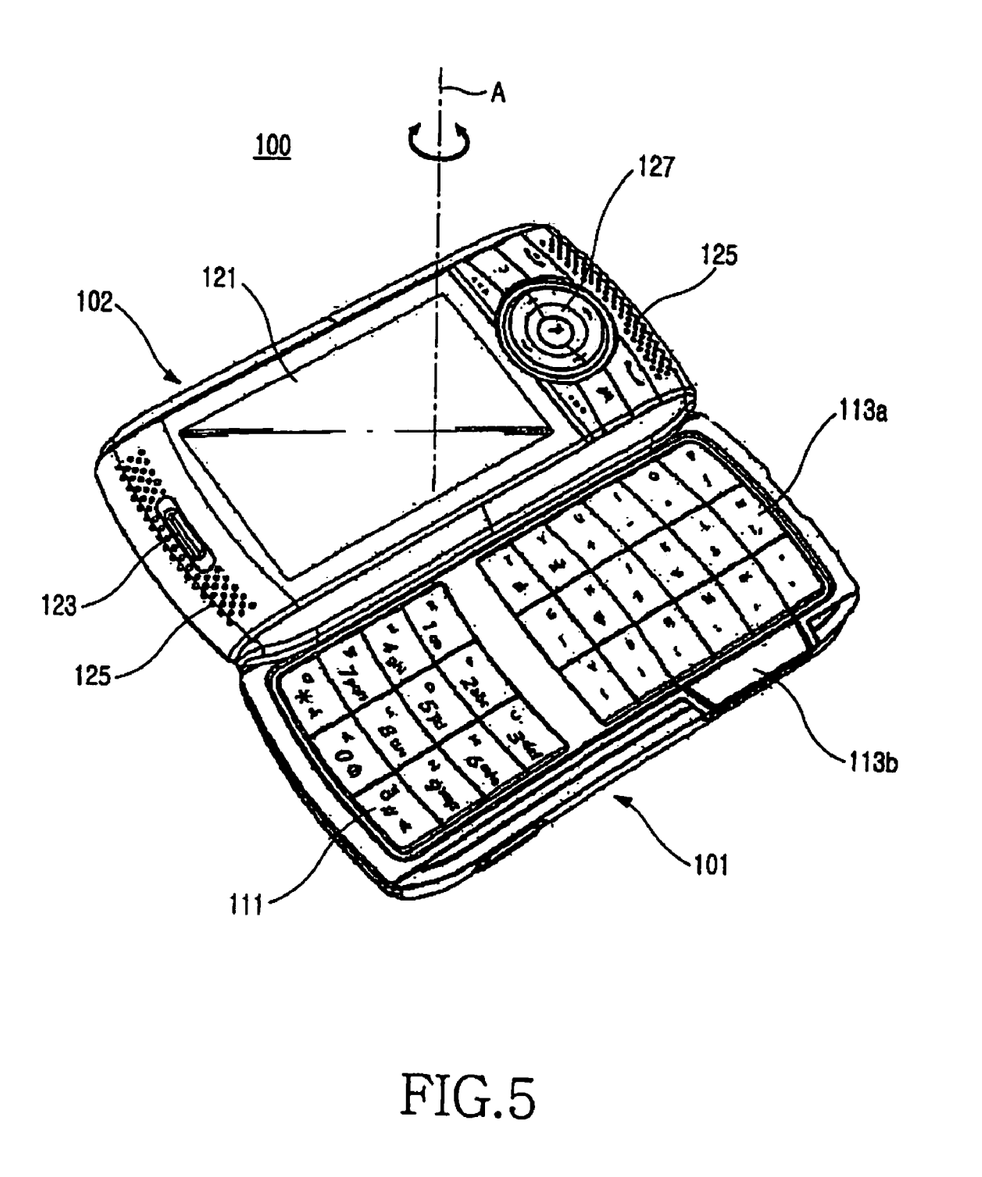
FIG. 5 is a perspective view of the mobile communications device of FIG. 1, in which the second body has rotated.

The first body section 101 is provided with a keypad 111 and a keypad 113a, both arranged on the upper surface thereof, in which the combination of the keypads 111, 113a has an arrangement of a QWERTY keyboard like the keyboards of general personal computers. When the second body section 102 is located at the first position, the keypads 111 and 113a are fully closed by the second body section 102. When the second body section 102 is located at the second position, the keypad 111 is exposed. When the second body section 102 is located at the third position, the keypads 111 and 113a are fully exposed. In addition, a space key 113b is arranged on the upper surface of the first body section 101 and is adjacent to the keypad 111, 113a. The space key 113b is opened only when the second body section 102 is located at the third position. When the second body section 102 is located at the second position, the keypad 111 is used as a numeric keypad. Further, when the second body section 102 is located at the third position, the keypads 111 and 113a are fully exposed to realize the QWERTY arrangement.

Hereinafter, the reference numeral "111" will be referred to as a "numeric keypad", and the combination of the keypads 111 and 113a will be referred to for short keypad 113a as a "QWERTY keypad," respectively. The numeric keypad 111 is disposed in a portion which is exposed when the second body section 102 is located at the second position. The QWERTY keypad 113a is exposed only when the second body section 102 is located at the third position. However, it should be noted that the numeric keypad 111 and the QWERTY keypad 113a are incorporated together in order to complete a full keypad in the QWERTY arrangement. The space key 113b is also disposed adjacent to the QWERTY keypad 113a. Therefore, the space key 113b is also opened when the second body section 102 is located at the third position.

The numeric keypad 111 is opened when the second body section 102 is located at the second position, so that the user can use the mobile communications device 100 in the same manner as in normal mobile phones. When the second body section 102 is located at the third position, both the numeric keypad 111 and the QWERTY keypad 113a are opened to complete the full QWERTY keyboard arrangement. Therefore, after moving the second body section 102 to the third position and putting the mobile communications device 100 latitudinally, the user can easily edit long messages as well as short messages using the keypad in the QWERTY arrangement with both hands.

Figure 2:
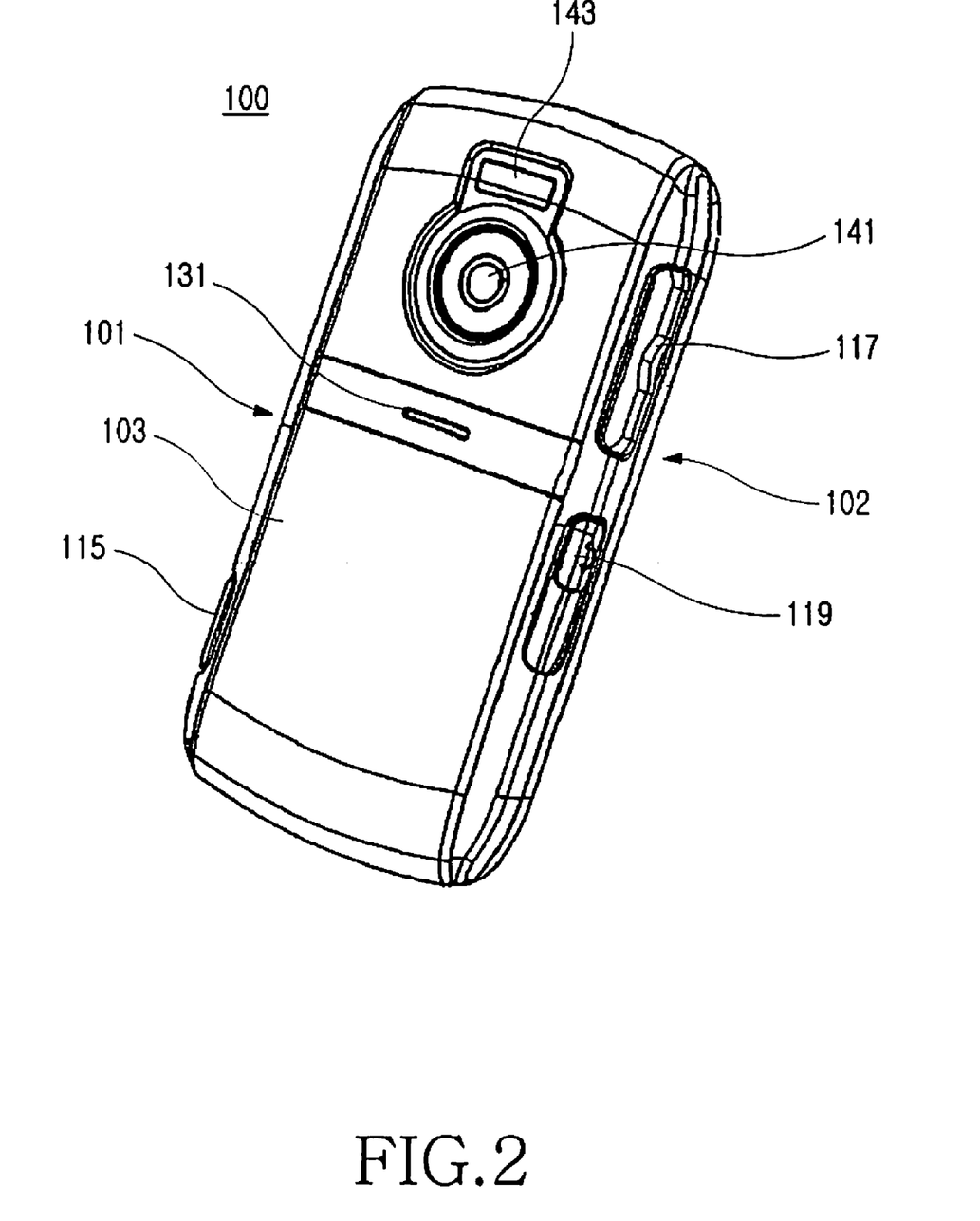
FIG. 2 is a rear perspective view of the mobile communications device of FIG. 1.

A camera lens 141 and a battery pack 103 are arranged in a rear surface of the first body section 101. The battery pack 103 is removable from the first body section 101. There is disposed, in the rear surface of the first body section 101, a button 131 for fastening and unfastening the battery pack 103. A mounting structure and a fastening or unfastening structure of the battery pack 103 will be easily understood by those skilled in the art.

A flash device 143 may be arranged at one side of the camera lens 141. The flash device 143 provides an illuminator to shine light on subjects for photography, by which the user can capture higher quality images in dark scenes.

The first body section 101 has, on its side surfaces, a shutter button 115, a volume control key 117, and jack covers 119. The shutter button 115, volume control key 117 and jack covers 119 may either all be disposed on one side surface or be disposed on both side surfaces according to products. This embodiment shows one configuration in which the shutter button 115 is disposed at one side surface of the first body section 101, and the volume control key 117 and jack covers 119 are at another side surface of the first body section 101.

The shutter button 115 is used as a switch for photographing images similar to normal camera devices. The volume control key 117 is a 2-way key and is used to control the audio output volume. The first body section 101 is provided with jack connectors, such as an earphone jack, interface connector jack and the like. To inhibit pollution of these jack connectors while not in use, cover devices are required. The jack covers 119 close the jack connectors provided to the mobile communications device 100 while the jack connectors are not in use. Jack covers are usually removable types, but the jack covers of this embodiment are sliding types that slide on the first body section 101 so as to open and/or close the jack connectors.

The second body section 102 is provided with a display screen 121 arranged on an upper surface thereof. A transmitter unit 124 and a receiver unit 123 are arranged on the second body section 102 above and below the display screen 121, respectively. The transmitter unit 124 and the receiver unit 123 are for voice communications, in which the transmitter unit 124 converts voices of the user into electric signals and the receiver unit 123 output voices of a call partner to the user. It will be easily understood by those skilled in the art that the transmitter unit 124 can be arranged at a lower end of the first body section 101.

Speaker devices 125 may be arranged on the first body section 101 above and below the display screen 121, respectively. The speaker devices 125 are for outputting sounds when playing back music files, using multimedia services, such as watching moving pictures and broadcasts, and playing games, in which the speaker devices 125 may be respectively disposed above and below the display screen 121 so as to realize stereo sound, 3-D sound, etc.

When the second body section 102 is located at the third position, the user can position and use the mobile communications device 100 latitudinally, where the display screen 121 outputs laterally long pictures. Further, while the mobile communications device 100 is being latitudinally used, the speaker devices 125 are respectively located at both side portions, so that the effect of the stereo sound and 3-D sound is much improved.

A functional keypad 127 is arranged in a lower portion of the second body section 102. The functional keypad 127 is operated for displaying, selecting, and executing a menu of embedded features, for example, schedule management, phone book, message editing, alarm setting, bell/vibration mode setting, etc. In the functional keypad 127, there are arranged a 4-way navigation key at the center portion thereof and a plurality of keys at both sides of the 4-way navigation key. In addition, there is arranged an "OK/ENTER" key at the center of the 4-way navigation key.

The keys disposed around the 4-way navigation key may be respectively assigned to frequently used features, such as a phone call START/END key, CANCEL key, menu displaying key, camera mode key, message mode key, etc. Therefore, even though the user does not display and navigate the menu and execute a menu item in full, the frequently used features can be executed by operating one key.

Hereinafter, examples of use of the above mobile communications device will be explained.

Referring to FIGS. 1 and 2, while the second body section 102 is overlaying the first body section 101, both the numeric keypad 111 and the QWERTY keypad 113a are closed. Therefore, it is inappropriate either to make a phone call or to edit a text message and a mail with the mobile communications device 100 in the closed state. On the contrary, when a call is received, the mobile communications device 100 can be connected with an originating mobile communications device by operating one of keys of the functional keypad, thereby enabling the user to answer the received call. Meanwhile, when the second body section 102 is located at the first position, the user can conveniently use the functional keypad 127 to execute multimedia features and to photograph subjects.

Namely, if one of the keys of the functional keypad 127 is given a function capable of converting the mode of the mobile communications device 100 into a music/moving picture playing mode and/or a broadcast mode, the user can utilize the mobile communications device 100 as a multimedia device despite being in the first position. Also, if one of the keys of the functional keypad 127 is given a function capable of converting the mode of the mobile communications device 100 into a photographing mode, the user can activate the photographing mode and conveniently photograph various subjects while viewing images to be photographed through the display screen 121. Also, even if one of the keys of the functional keypad 127 is not given the function for converting the mode of the mobile communications device 100 into the music/moving picture playback mode and/or the broadcast mode or the photographing mode, it is apparent that the menu displaying key, the 4-way navigation key, etc may be used for converting the mode of the mobile communications device into the corresponding modes.

It has been mentioned above that the shutter button 115 is arranged on the one side surface of the first body section 101. Even if there is not disposed, in the functional keypad 127, the key for converting the mode of the mobile communications device 100 into the photographing mode, the shutter button 115 may be configured to convert the mode of the mobile communications device 100 into the photographing mode when first operated. In this way, the control manner for converting the operation mode of the mobile communications device 100 can be realized in various ways.

Figure 4:
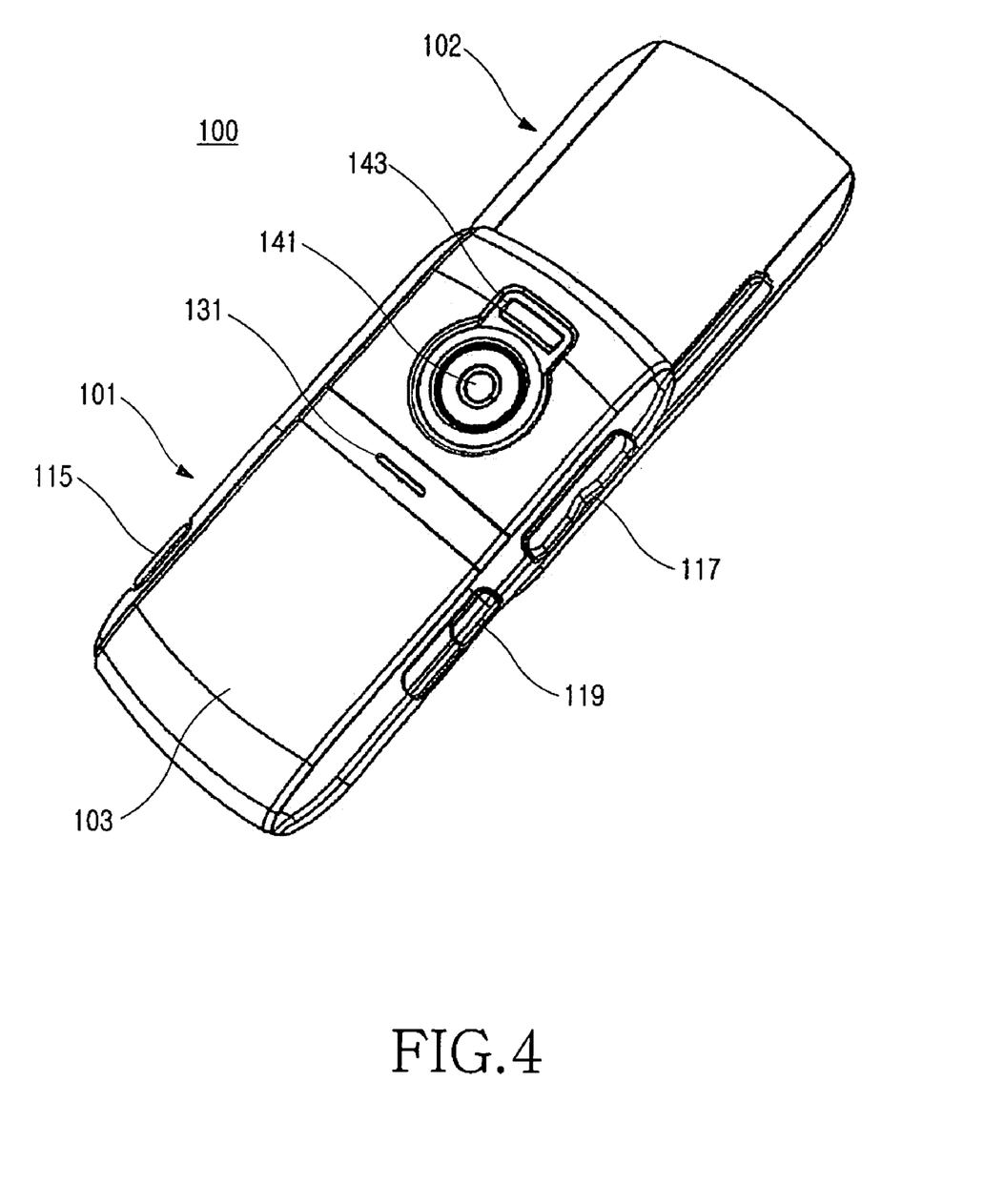
FIG. 4 is a rear perspective view of the mobile communications device of FIG. 3.

As shown in FIGS. 3 and 4, when the second body section 102 is located at the second position, the numeric keypad 111 is opened. The mobile communications device 100 can be conveniently used as the mobile phone in the opened state of the numeric keypad 111. Namely, when the second body section 102 is located at the second position, the user can conveniently either input a phone number of a call partner and send a call signal, or edit the short text message. At this time, similar to the mode conversion in the first point, it is also possible to convert the mode of the mobile communications device 100 into the multimedia mode or the photographing mode in the second position.

Figure 6:
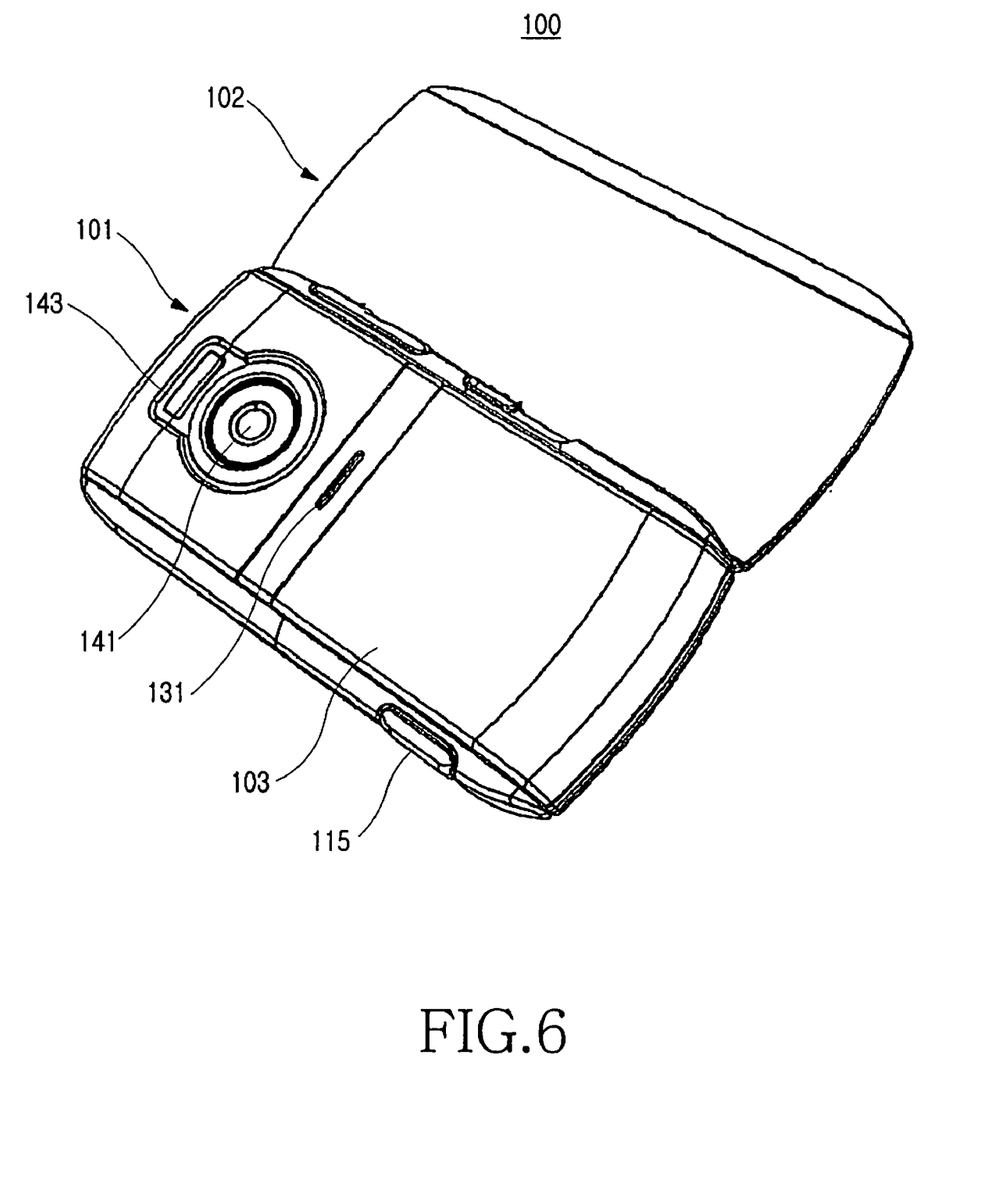
FIG. 6 is a rear perspective view of the mobile communications device of FIG. 5.

As shown in FIGS. 5 and 6, when the second body section 102 has rotated about the rotation axis A by an angle of 180° to move into the third position, the second body section 102 is placed at the one side of and in parallel to the first body section 101. Then, the QWERTY keypad 113a also is fully exposed, so that the QWERTY keypad, together with the numeric keypad 111, realizes the full keypad in the QWERTY arrangement, and the space key 113b is also exposed. In this way, when the keypad in the QWERTY arrangement has been realized by placing the second body section 102 in the third position, the user can position the mobile communications device 100 transversely and conveniently edit numerals and short/long text messages using the keypad in the QWERTY arrangement with both hands. In addition, a part of the numeric keypad 111 and/or the QWERTY keypad 113a may be given functions of, for example, direction keys and a shooting key, so that the user can more conveniently use them in various types of games. Further, even when traveling, the user can enjoy moving pictures and the like in the multimedia mode of the mobile communications device 100, or can connect to wireless internet and perform information searches conveniently using the keypad in the QWERTY arrangement.

Figure 7:
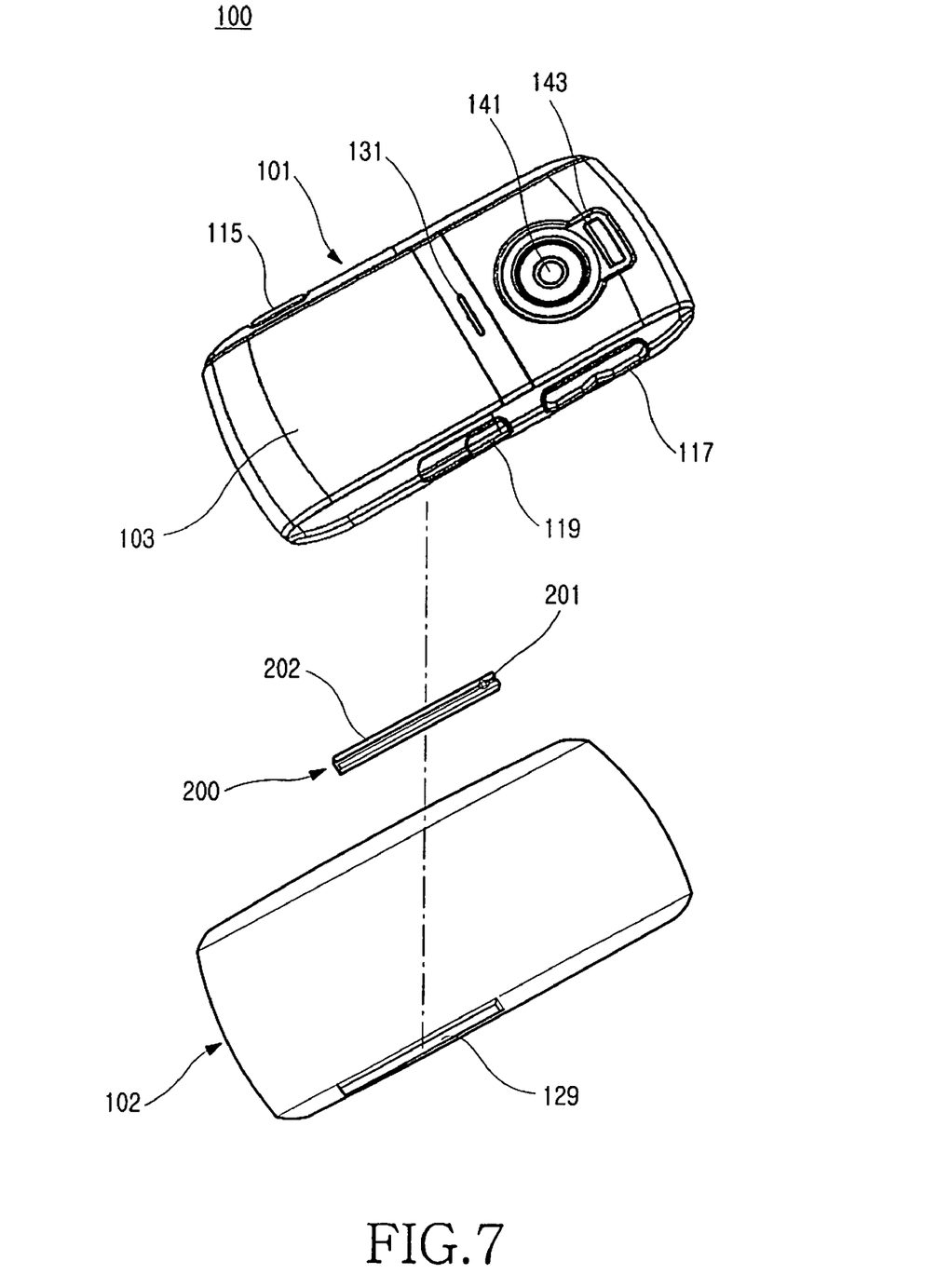
FIG. 7 is an exploded perspective view of the mobile communications device of FIG. 1.
Figure 8:
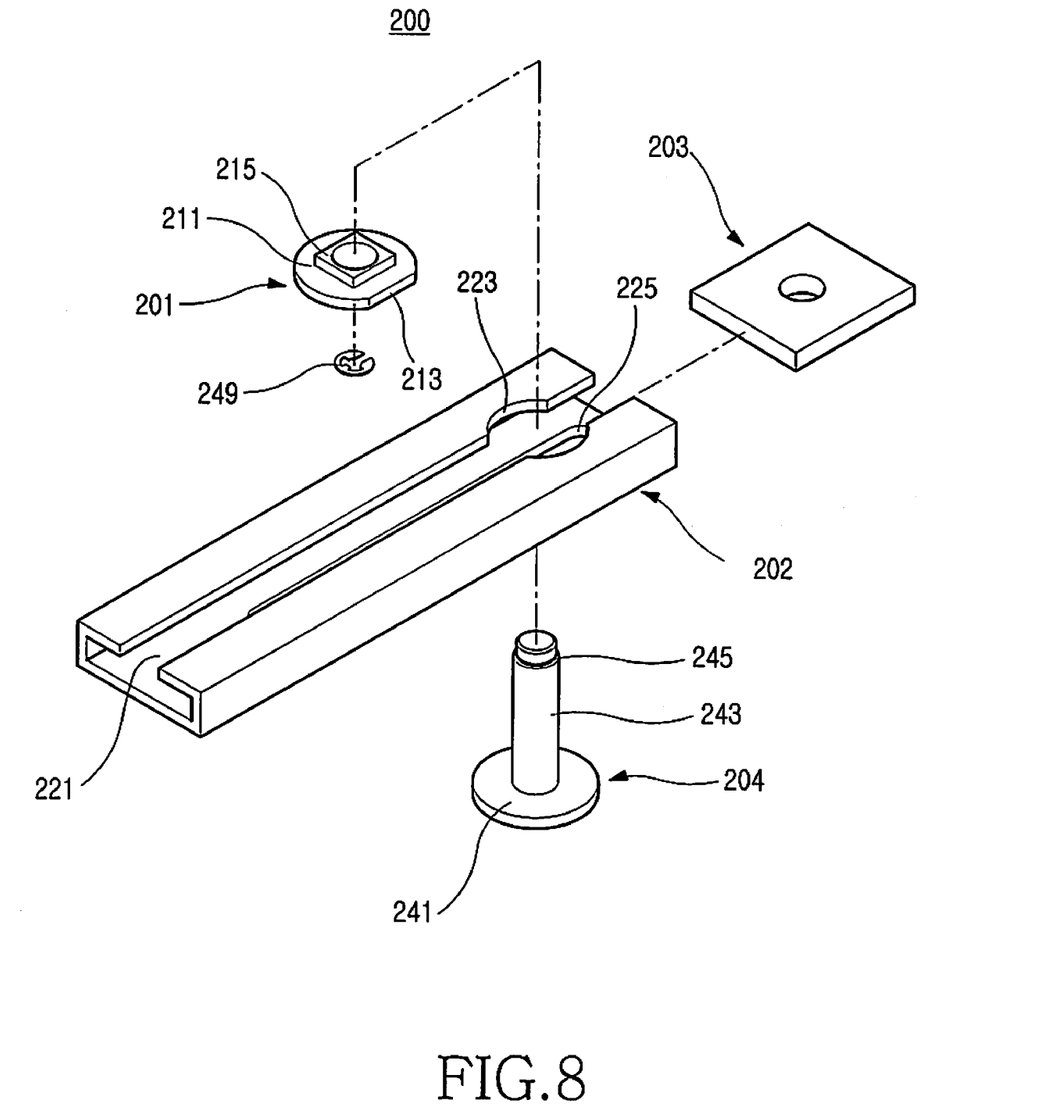
FIG. 8 is an exploded perspective view of a sliding module of the mobile communications device of FIG. 7.

In order to couple the first body section 101 and the second body section 102 together, the mobile communications device 100 is provided with a supporter 201 and a guide rail 202 (FIGS. 7 and 8).

The supporter 201 is mounted to the first body section 101 so as to guide sliding movement of the second body section 102 and support rotating movement of the second body section 102. The supporter 201 includes a fixing plate 211 fixed to the first body section 101 and a first slider 215 formed on first surface of the fixed plate 211. The fixed plate 211 has a plane 213 on a part of its circumferential surface. There is formed, at the center portion of the one side the first body section 101, a hole (not shown) corresponding to the shape of the fixing plate 211. With this, the fixing plate 211 is fixed to the first body section 101 while it is held so as the fixing plate 211 not to rotate. The first slider 215 is a polygonal-shaped, preferably, a square-shaped plate, that protrudes from the first surface of the fixing plate 211. The first slider 215 is connected to the guide rail 202 in such a manner that it can either slide or rotate within the guide rail 202, specifically a first guide slit 221 to be explained below.

The guide rail 202 extends in a longitudinal direction of the first body section 101 and is mounted to a mounting recess 129 formed at one side of a rear face of the second body section 102. The mounting recess 129 is a shape corresponding to the shape of the guide rail 202 and extends in a longitudinal direction of the second body section 102. There is formed, on a first surface of the guide rail 202, the first guide slit 221 extending in a longitudinal direction of the guide rail 202. The first guide slit 221 is formed with a rotation hole 223 thereon. The rotation hole 223 is formed in a circle shape by cutting a part of the inner walls of the first guide slit 221.

Here, the first guide slit 221 has a width corresponding to the length of one side of the first square-shaped slider 215. The rotation hole 223 has a diameter larger than the length of a diagonal line of the first slider 215.

When the second body section 102 slides, the supporter 201 guides the linear movement of the guide rail 202 in which both side walls of the first slider 215 are in sliding contact with the inner walls of the first guide slit 221 because the width of the first guide slit 221 corresponds to the length of one side of the first slider 215.

Also, when the second body section 102 is located at the first position, the first slider 215 is received in the rotation hole 223. The rotation hole 223 provides a sufficient space capable of receiving the first slider 215, by which the second body section 102 can rotate from the first position to the third position. On the contrary, when the second body section 102 slides to escape from the first position, the second body section 102 is prevented from rotating because both side walls of the first slider 215 are in sliding contact with the inner walls of the first guide slit 221.

Namely, when the second body section 102 linearly moves so as to escape from the first position, the second body section 102 is prevented from rotating due to the configurations of the first slider 215 and the first guide slit 221.

While this embodiment discloses the first slider 215 of the square shape, the shape of the first slider 215 may be changed into various shapes. Namely, the first slider 215 may be manufactured in the shape of a regular hexagon, regular octagon or rectangle, etc. However, it should be noted that even if the shape of the first slider 215 is changed, the rotation hole 223 has to provide sufficient space allowing the first slider 215 to rotate therein, and one of outer side surfaces of the first slider 215 has to be in sliding contact with one of the inner walls of the first guide slit 221 and at the same time prevent the first slider 215 from rotating while the second body section 102 is linearly moving.

In order to connect the guide rail 202 to the supporter 201, the mobile communications device 100 is provided with a second slider 203 and a connecting member 204. The second slider 203 is accommodated within the guide rail 202 so as to guide the linear movement of the second body section 102, specifically the linear movement of the guide rail 202, and support the rotation of the guide rail 202.

The connecting member 204 includes a supporting plate 241, a supporting axis 243, and a connecting groove 245. The supporting plate 241 is supported on a second surface of the guide rail 202, and the supporting axis 243 is disposed through the second slider 203 and supporter 201 by being inserted from the second surface. When the connecting member 204 passes through the supporter 201, the connecting groove 245 is exposed from the first surface of the supporter 201. Then, a C-ring 249 is mounted onto the connecting groove 245 so as to connect the guide rail 202 and second slider 203 with the supporter 201. With this, the second slider 203 together with the guide rail 202 rotate relative to the supporter 201 while being supported by the connecting member 204. Also, the guide rail 202 linearly moves while being supported by the supporter 201 and second slider 203.

There is formed, on the second surface of the guide rail 202, a second guide slit 225 which is receiving the connecting member 204 therein while the guide rail 202 is linearly moving. Namely, the connecting member 204 moves in the second guide slit 225 while the guide rail 202 linearly moves.

Although not shown in the drawings, there may be disposed washers at places where rubbing may occur while the second body section 102 is rotating, for example, between the supporting plate 241 of the connecting member 204 and the second surface of the guide rail 202, between the supporter 201 and the second slider 203, and between the supporter 201 and the C-ring 249. By disposing the washers at the places where the rubbing may occur while the second body section 102 is rotating, wear and noise due to the rubbing can be reduced.

As described above, in the mobile communications device according to the present invention, the QWERTY keypad can be selectively opened according to the movement direction of the second body section. Accordingly, the mobile communications device of the present invention can fully utilize electronics that are being more and more integrated and incorporated features thereof. Also, the mobile communications device can be conveniently used as a mobile phone when the second body section has linearly moved, and it can be easily used in editing long text messages, that is, mail when the second body section has rotated to be located in parallel to the first body section.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile communications device comprising:
    a first body section having a keypad arranged on a first upper surface of the first body section;
    a second body section connected to the first body section, the second body section having a display screen arranged on a second upper surface of second body section;
    a supporter mounted at a midpoint of one side of the first body section; and
    a guide rail mounted at one side of the second body section in a longitudinal direction of the second body section,
    wherein the second body section linearly slides from a first position at which the second body section overlays the first body section to a second position at which the second body section exposes a first part of the keypad, the first part providing input functions of numerals and letters, and the second body section rotates about a rotation axis while facing the first upper surface from the first position to a third position at which the second body section fully exposes the keypad, and
    wherein the guide rail is operable to linearly and reciprocally move in a longitudinal direction of the first body section while being supported by the supporter, and operable to rotate relative to the supporter when the second body section rotates from the first position to the third position.

2. The mobile communications device as claimed in claim 1, wherein the rotation axis is perpendicular to the first upper surface.

3. The mobile communications device as claimed in claim 2, wherein the second body section rotates about the rotation axis by an angle of 180° from the first position to the third position.

4. The mobile communications device as claimed in claim 3, wherein the rotation axis is positioned at a midpoint of one side on the first body section, so that at the third position the second body section is located at the one side.

5. The mobile communications device as claimed in claim 1, wherein the keypad has a QWERTY keyboard arrangement.

6. The mobile communications device as claimed in claim 5, further comprising a space key disposed in the first upper surface and adjacent to the keypad.

7. The mobile communications device as claimed in claim 1, further comprising:
    a camera lens mounted in a rear surface of the first body section; and
    a flash device disposed adjacent to the camera lens.

8. The mobile communications device as claimed in claim 7, further comprising a shutter button disposed on one side surface of the first body section.

9. The mobile communications device as claimed in claim 1, further comprising a functional keypad disposed below the display screen.

10. The mobile communications device as claimed in claim 1, further comprising a receiver unit disposed above the display screen and a transmitter unit disposed below the display screen.

11. The mobile communications device as claimed in claim 1, further comprising at least two speaker devices respectively disposed above and below the display screen.

12. A mobile communications device comprising:
a first body section having a keypad arranged in a first upper surface of the first body section, the first body section providing a rotation axis perpendicular to the first upper surface;
a second body section connected to the first body section, the second body section having a display screen arranged in a second upper surface of the second body section and having at least two speaker devices disposed respectively above and below the display screen;
a supporter mounted at a midpoint of one side of the first body section; and
a guide rail mounted at one side of the second body section in a longitudinal direction of the second body section,
wherein the second body section linearly slides from a first position at which the second body section overlays the first body section to a second position at which the second body section exposes a first part of the keypad, and rotates about the rotation axis from the first position to a third position at which the second body section fully exposes the keypad, and
wherein the guide rail is operable to linearly and reciprocally move in a longitudinal direction of the first body section while being supported by the supporter, and operable to rotate relative to the supporter when the second body section rotates from the first position to the third position.

13. The mobile communications device as claimed in claim 12, wherein the keypad has a QWERTY keyboard arrangement, and the first part of the keypad provides input functions of numerals and short text messages.

14. The mobile communications device as claimed in claim 13, further comprising a space key disposed in the first upper surface and adjacent to the keypad.

15. The mobile communications device as claimed in claim 12, wherein in the third position the second body section is located at one side of and in parallel to the first body section.

16. The mobile communications device as claimed in claim 12, further comprising a transmitter unit and a receiver unit, the transmitter unit and the receiver unit being respectively disposed below and above the display screen.

17. The mobile communications device as claimed in claim 12, further comprising:
a first guide slit formed in a first surface of the guide rail;
a circular rotation hole formed on the first guide slit; and
a first slider provided to the supporter, the first slider being a polygonal-shaped plate, wherein the first slider rotates in the rotation hole when the second body section rotates.

18. The mobile communications device as claimed in claim 17, wherein the first slider is a square shape.

19. The mobile communications device as claimed in claim 18, wherein both side walls of the first slider are in sliding contact with inner walls of the first guide slit when the second body section slides.

20. The mobile communications device as claimed in claim 12, further comprising:
a second slider sliding within the guide rail; and
a connecting member connected to the second slider and the supporter in such a manner that the connecting member passes through the second slider and the supporter sequentially,
wherein the guide rail linearly moves relative to the supporter and the second slider, and the guide rail together with the second slider rotate relative to the supporter.

21. The mobile communications device as claimed in claim 20, further comprising:
a connecting groove formed on an outer circumferential surface of an end of the connecting member; and
a C-ring mounted in the connecting groove,
wherein the connecting groove is exposed so that the connecting member passes through the supporter, and the C-ring is mounted in the connecting groove so as to connect the guide rail and the second slider to the supporter.

22. The mobile communications device as claimed in claim 20, further comprising a second guide slit formed in a second surface of the guide rail, wherein the connecting member moves in the second guide slit while the guide rail linearly moves.

* * * * *